United States Patent
Dill et al.

(10) Patent No.: US 7,116,516 B2
(45) Date of Patent: Oct. 3, 2006

(54) MAGNETIC HEAD HAVING WRITE HEAD WITH HELICAL COIL AND METHOD FOR FABRICATION THEREOF

(75) Inventors: Frederick Hayes Dill, South Salem, NY (US); Robert Edward Fontana, Jr., San Jose, CA (US); Richard Hsiao, San Jose, CA (US); Hugo Alberto Emilio Santini, San Jose, CA (US)

(73) Assignee: Hitachi Global Storage Technologies Netherlands, B.V., Amsterdam (NL)

( * ) Notice: Subject to any disclaimer, the term of this patent is extended or adjusted under 35 U.S.C. 154(b) by 176 days.

(21) Appl. No.: 10/611,090

(22) Filed: Jun. 30, 2003

(65) Prior Publication Data

US 2004/0264045 A1 Dec. 30, 2004

Related U.S. Application Data

(62) Division of application No. 09/535,089, filed on Mar. 21, 2000.

(51) Int. Cl.
*G11B 5/127* (2006.01)

(52) U.S. Cl. .................... 360/123; 29/603.15

(58) Field of Classification Search ............... 360/123, 360/126, 317, 76; 29/603.12, 603.15; 205/119
See application file for complete search history.

(56) References Cited

U.S. PATENT DOCUMENTS

| | | | |
|---|---|---|---|
| 3,614,554 A | 10/1971 | Richardson et al. | |
| 3,662,119 A | 5/1972 | Romankiw et al. | |
| 4,357,640 A | 11/1982 | Heinz et al. | |
| 4,985,985 A | 1/1991 | Das | |
| 5,022,141 A | 6/1991 | Nagata et al. | |
| 5,174,012 A * | 12/1992 | Hamilton ............... | 204/192.22 |
| 5,296,992 A | 3/1994 | Abe | |
| 5,621,594 A | 4/1997 | Gray et al. | |
| 5,703,740 A | 12/1997 | Cohen et al. | |
| 5,777,829 A * | 7/1998 | Voldman et al. ............ | 360/128 |
| 5,853,558 A * | 12/1998 | Yamada et al. ............ | 205/119 |
| 5,883,760 A * | 3/1999 | Yamada et al. ............... | 360/76 |
| 5,901,432 A * | 5/1999 | Armstrong et al. ...... | 29/603.14 |
| 5,950,301 A * | 9/1999 | Gray et al. .............. | 29/603.12 |
| 5,969,911 A * | 10/1999 | Hikami et al. ............. | 360/317 |
| 5,995,342 A * | 11/1999 | Cohen et al. ............... | 360/126 |
| 6,163,435 A | 12/2000 | Gaud et al. | |
| 6,195,232 B1 * | 2/2001 | Cohen ........................ | 360/126 |
| 6,226,149 B1 * | 5/2001 | Dill, Jr. et al. ............ | 360/126 |
| 6,236,538 B1 * | 5/2001 | Yamada et al. ............. | 360/126 |

(Continued)

*Primary Examiner*—Tianjie Chen
(74) *Attorney, Agent, or Firm*—Robert O. Guillot; Intellectual Property Law Offices (57) ABSTRACT

The present invention is a magnetic head having a helical induction coil and includes hard disk drive devices that utilize the magnetic head. The helical coil is fabricated around a magnetic pole yoke in a series of process steps that include a reactive ion etch (RIE) process step which is utilized to simultaneously form vertical interconnect vias and upper helical coil member trenches. Thereafter, in a single fabrication step, such as by electroplating, the vertical interconnect lines and the upper helical coil traces are created in a single fabrication step, such that they are integrally formed. The vertical interconnect lines provide an electrical connection between outer ends of previously formed lower helical coil traces and outer ends of the integrally formed upper helical coil traces, such that a helical coil is fabricated. In the preferred embodiment, the helical coil is composed of copper.

10 Claims, 8 Drawing Sheets

U.S. PATENT DOCUMENTS 6,275,354 B1 * 8/2001 Huai et al. .................. 360/126
6,459,543 B1 * 10/2002 Sasaki ........................ 360/126
6,570,739 B1 * 5/2003 Hsiao et al. ................. 360/123
6,819,527 B1 * 11/2004 Dill et al. ................... 360/123

* cited by examiner

MAGNETIC HEAD HAVING WRITE HEAD WITH HELICAL COIL AND METHOD FOR FABRICATION THEREOF

CROSS-REFERENCE TO RELATED APPLICATION

This application is a divisional application of U.S. patent application Ser. No. 09/535,089, filed Mar. 21, 2000.

BACKGROUND OF THE INVENTION

1. Field of the Invention

The present invention relates generally to magnetic heads that are utilized with thin film hard disk data storage devices, and more particularly to the design and fabrication of helical induction coils that are utilized in the write head components of such magnetic heads.

2. Description of the Prior Art

The ongoing efforts to develop magnetic heads having increased data writing rates are impacted by the design of the induction coils that are utilized to generate the magnetic flux of the write head. While the flat, spiral induction coils of prior art magnetic heads have been adequate, the overall length of the spiral induction coil element has a relatively high resistance and/or inductance which becomes problematic at high frequencies, as well as creating unwanted magnetic head heating due to the passage of current through the relatively high resistance coil element. Additionally, the footprint of the flat spiral coil is relatively large. This large footprint poses difficulties in placing elements close together to realize large scale integration.

To solve some of these problems, helical coils have been developed. Such coils are fabricated to wrap around the magnetic pole yoke. However, fine pitch helical coils are generally more difficult to fabricate than the prior art flat spiral coils. The present invention includes a magnetic head having a helical coil and a method for fabricating the helical coil that produces a finer pitch helical coil with fewer, simple fabrication steps than the prior art helical coils.

SUMMARY OF THE INVENTION

The present invention is a magnetic head having a helical induction coil and includes hard disk drive devices that utilize the magnetic head. The helical coil is fabricated around a magnetic pole yoke in a series of process steps that include a reactive ion etch (RIE) process step which is utilized to simultaneously form vertical interconnect vias and upper helical coil member trenches. Thereafter, in a single fabrication step, such as by electroplating, the vertical interconnect lines and the upper helical coil traces are created in a single fabrication step, such that they are integrally formed. The vertical interconnect lines provide an electrical connection between outer ends of previously formed lower helical coil traces and outer ends of the integrally formed upper helical coil traces, such that a helical coil is fabricated. In the preferred embodiment, the helical coil is composed of copper.

It is an advantage of the magnetic head of the present invention that a hard disk drive incorporating the magnetic head can be more economically manufactured.

It is another advantage of the magnetic head of the present invention that it includes a fine pitch helical induction coil that is simpler and easier to fabricate.

It is a further advantage of the magnetic head of the present invention that it includes a helical induction coil that includes vertical interconnect lines and upper helical coil traces that are integrally formed.

It is yet another advantage of the magnetic head of the present invention that vertical vias and upper helical coil trenches are fabricated in a single fabrication process step, such that the fabrication of the helical coil is simplified.

It is an advantage of the fabrication method of the magnetic head of the present invention that a single fabrication step is utilized to create vertical interconnect vias and upper helical coil trenches, such that alignment problems of these components are eliminated.

It is another advantage of the fabrication method of the magnetic head of the present invention that the vertical interconnect lines and the upper helical coil traces are integrally formed in a single fabrication step, such that only one metallization step is required.

These and other features and advantages of the present invention will no doubt become apparent to those skilled in the art upon review of the following detailed description which makes reference to the several figures of the drawings.

IN THE DRAWINGS

FIGS. 2 and 3 depict a first process step in the fabrication of the helical induction coil of the present invention, wherein

FIGS. 5 and 6 depict a further process step of the present invention, wherein

FIGS. 7 and 8 depict a further process step of the present invention, wherein

FIGS. 9 and 10 depict yet a further fabrication step of the present invention, wherein

FIGS. 11, 12 and 13 depict a further process step of the present invention, wherein

FIGS. 14 and 15 depict a further process step of the present invention, wherein

FIGS. 16, 17 and 18 depict a further process step of the present invention, wherein

FIGS. 19, 20 and 21 depict a further process step of the present invention, wherein

FIGS. 22 and 23 depict a further process step of the present invention, wherein

DETAILED DESCRIPTION OF THE PREFERRED EMBODIMENTS

The magnetic head of the present invention is suitable for use with well known hard disk drive devices. A significant feature of the magnetic head of the present invention is the helical induction coil that is fabricated around the yoke portion of the second magnetic pole. The fabrication steps described herebelow produce a fine pitched helical coil that is simpler and easier to manufacture than prior art helical coils.

Figure 1:
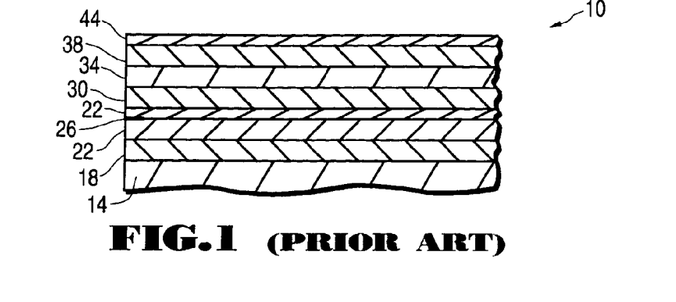
FIG. 1 is a is a side cross-sectional view schematically depicting a process step in the fabrication of prior art magnetic heads.

FIG. 1 is a side, cross sectional view of a process step in the fabrication of magnetic heads that is well known in the prior art and will serve as a starting point in the description of the present invention. As depicted in FIG. 1, the fabrication of the magnetic head 10 includes a slider substrate base 14 having a first read shield (S1) layer 18 deposited thereupon. Insulation layers 22 with a read head element 26 fabricated therewithin are formed upon the S1 shield layer 18. Thereafter, a second read head shield (S2) layer 30 is formed upon the insulation layers, followed by another insulation layer 34 and a first write head magnetic pole (P1) layer 38. In well known alternative head design, termed a merged head, a single layer serves the dual purpose of the S2 and P1 layers; that is, the single layer serves as both a read head shield and a first write head magnetic pole. The present invention is suitable for use with either type of magnetic head design. A write head gap layer 44 is thereafter deposited upon the P1 layer. The fabrication steps of the present invention are next described commencing with FIGS. 2 and 3.

Figure 2:
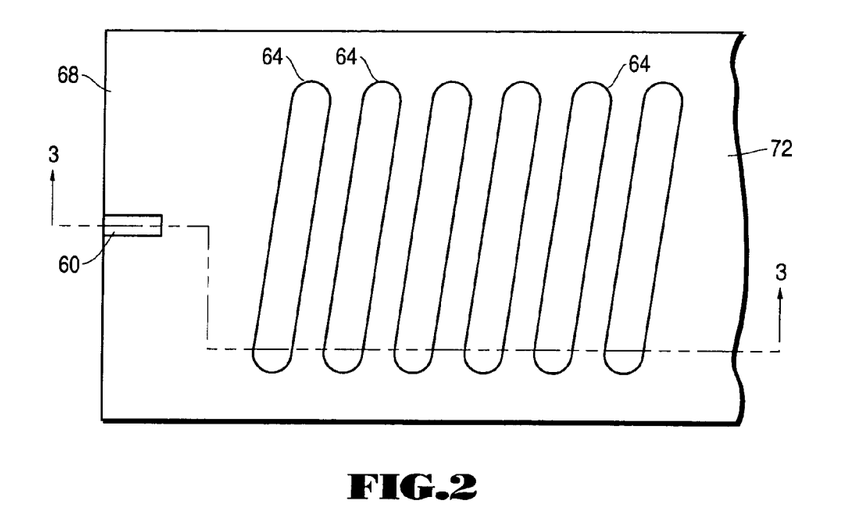
FIG. 2 is a top plan view of the device.
Figure 3:
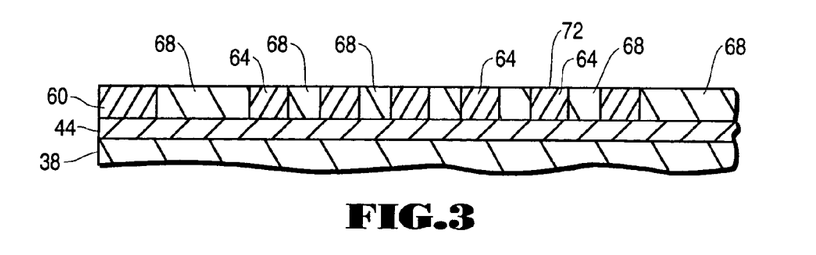
FIG. 3 is a side cross-sectional view taken along lines 3—3 of FIG. 2.
Figure 4:
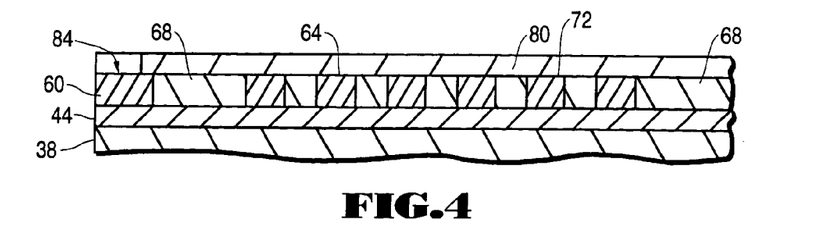
FIG. 4 is a side cross-sectional view taken along identical lines as FIG. 3, depicting a further process step of the present invention.
Figure 5:
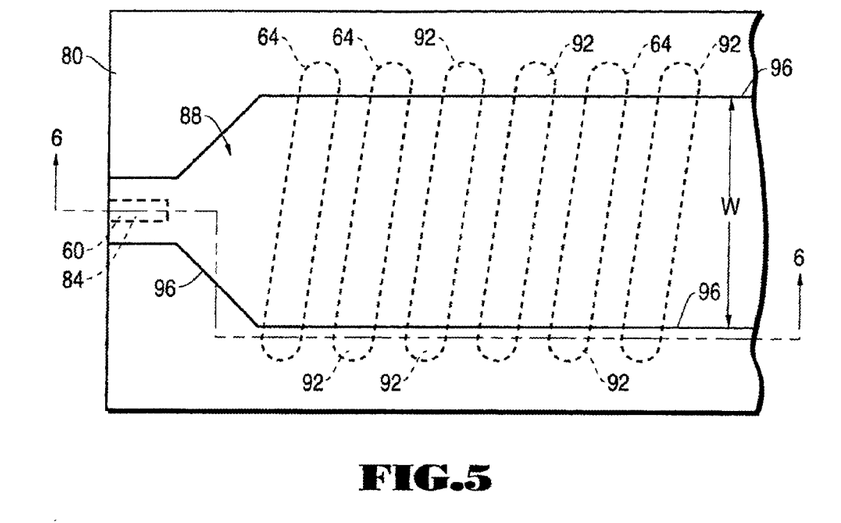
FIG. 5 is a top plan view of the device.
Figure 6:
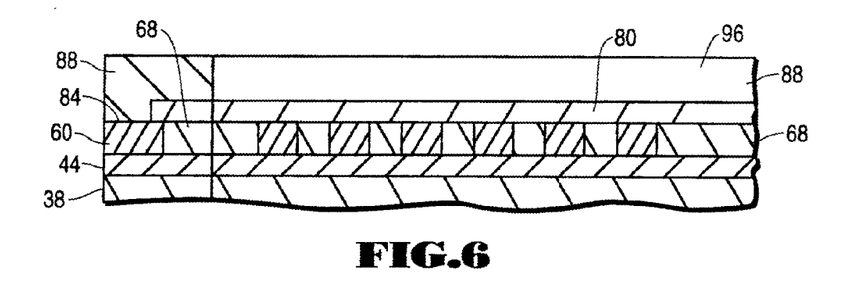
FIG. 6 is a side cross-sectional view taken along lines 6—6 of FIG. 5.

FIG. 2 is a top plan view depicting the next fabrication steps, and FIG. 3 is a cross-sectional view of the device depicted in FIG. 2 taken along lines 3—3 of FIG. 2. As depicted in FIGS. 2 and 3, a P2 pole tip 60, generally composed of NiFe 45/55, is fabricated upon the write gap layer 44 in a fabrication step that is well known to those skilled in the art. Also fabricated upon the write gap layer 44 are a plurality of lower traces 64 of the helical coil. The lower coil traces 64 are fabricated photolithographically and plated up with copper, and a tantalum/copper seed layer is preferably first deposited to facilitate the plating of the copper bottom coil traces 64. Following the removal of the photoresist, an insulator material 68, such as $Al_2O_3$ is deposited, and this step is followed by a chemical mechanical polishing (CMP) step which results in a flat top surface 72. Thereafter, as depicted in FIG. 4, a second layer 80 of insulator material is deposited upon the polished surface 72 of the device. The insulator layer is patterned such that the upper surface 84 of the P2 pole tip 60 is exposed. The insulator material of layer 80 can be SiO2 or a thermally stable polymer. Thereafter, as depicted in FIGS. 5 and 6, using well-known photolithographic techniques, a yoke 88 is fabricated on top of the insulator layer 80, such that a good electromagnetic connection is made between the yoke 88 and the P2 pole tip 60 at the P2 pole tip surface 84. Significantly the width w of the yoke is less than the length of the lower helical coil traces, as can best be seen in FIG. 5 such that the outer ends 92 of the lower helical coil traces 64 project outwardly beyond the lateral edges 96 of the yoke.

Figure 7:
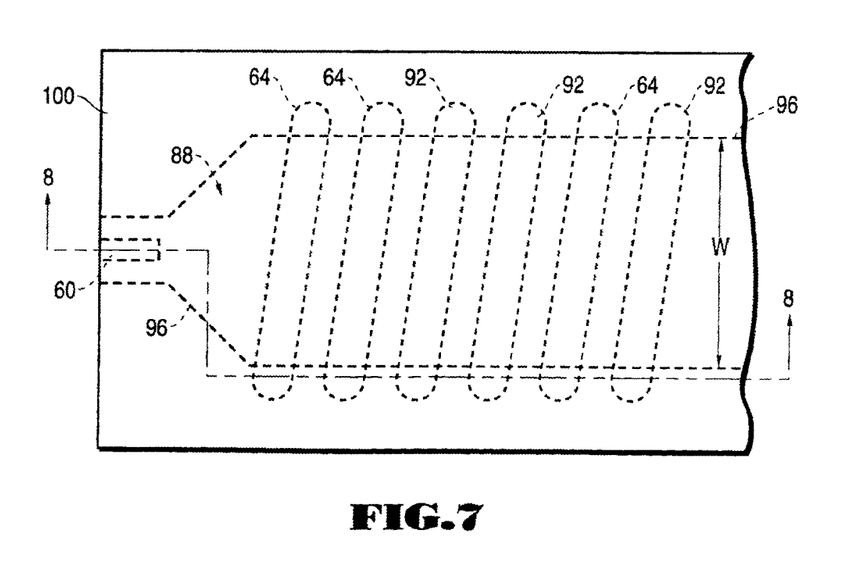
FIG. 7 is a top plan view of the device.
Figures 8, 9:
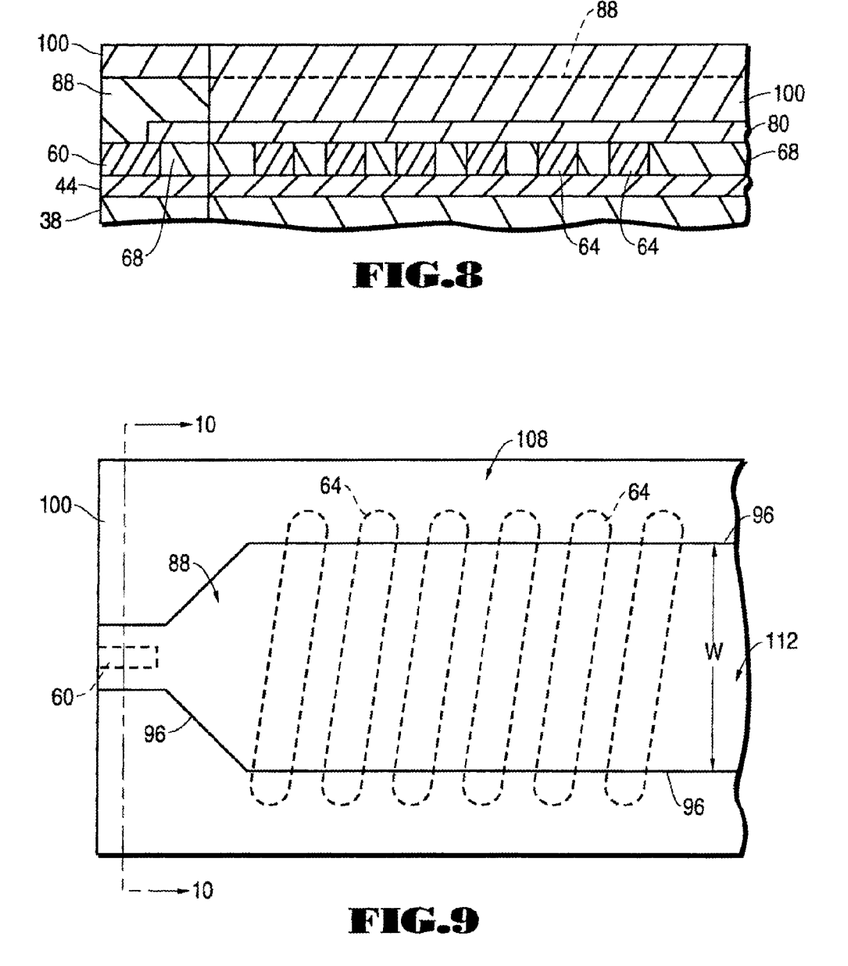
FIG. 8 is a cross-sectional view taken along lines 8—8 of FIG. 7.
FIG. 9 is a top plan view of the device.
Figure 10:
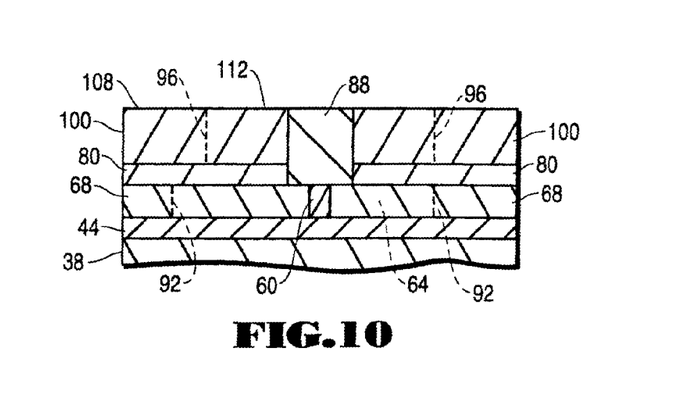
FIG. 10 is an end cross-sectional view taken along lines 10—10 of FIG. 9.
Figure 11:
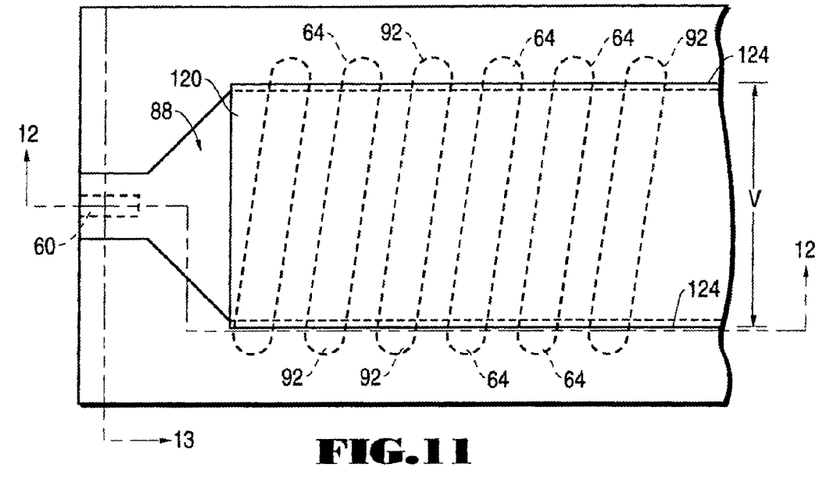
FIG. 11 is a top plan view.
Figure 12:
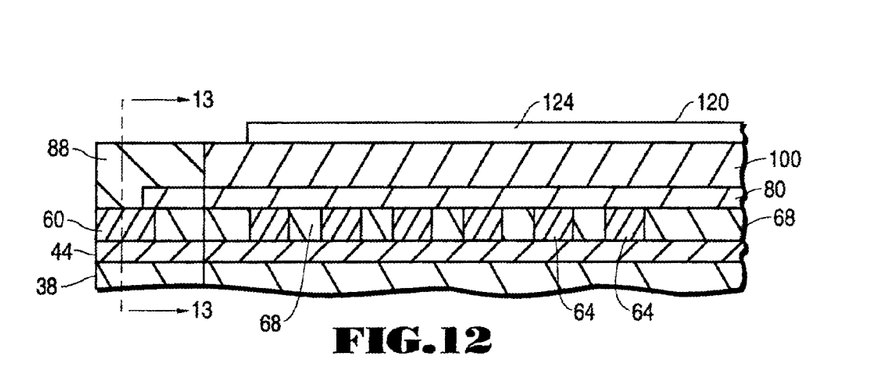
FIG. 12 is a side cross-sectional view taken along lines 12—12 of FIG. 11.
Figure 13:
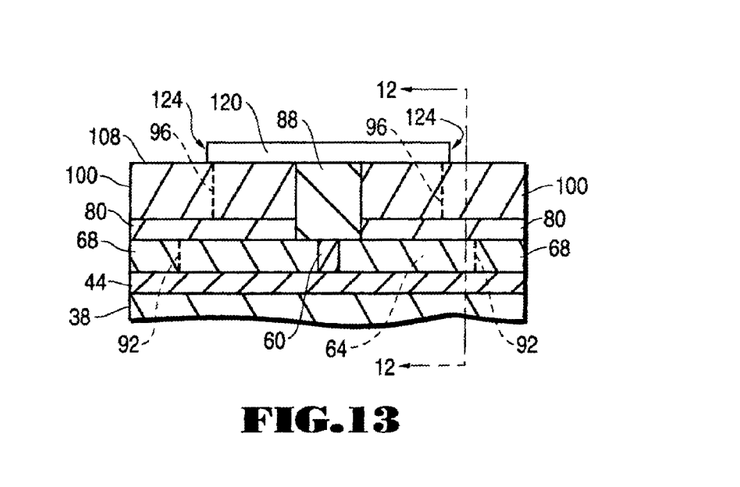
FIG. 13 is an end cross-sectional view taken along lines 13—13 of FIGS. 11 and 12.

Thereafter, as is depicted in FIGS. 7 and 8, a further layer of insulator material 100 preferably utilizing the same material that has been utilized in insulator layer 80, is deposited upon the upper surface of the device. This step is followed by a second CMP step as depicted in FIGS. 9 and 10, to produce a flat upper surface 108 which exposes the yoke surface 112 and retains the insulator material 100 along the sides 96 of the yoke 88, as is best seen in FIG. 10. Thereafter, as depicted in FIGS. 11, 12 and 13, a patterned etch stop layer 120 is deposited upon the yoke surface 112. As is best seen in FIGS. 11 and 13, the width v of the etch stop layer 120 is sufficient to cover the yoke surface 112, however the outer ends 92 of the lower helical coil traces extend beyond the outer edges 124 of the etch stop layer 120. The etch stop layer 120 is fabricated from a material which has significantly greater resistance to a reactive ion etch (RIE) process than the material utilized to fabricate the insulator layers 80 and 100. Therefore, where the insulator layers 80 and 100 are composed $SiO_2$, an aluminum oxide etch stop layer 120 is fabricated; whereas, if the insulator layers 80 and 100 are composed of a polymer composition, the etch stop layer 120 can be composed of either $SiO_2$ or aluminum oxide. Of course, an appropriate etchant species is utilized in the following RIE etching step as is described herebelow.

Figure 14:
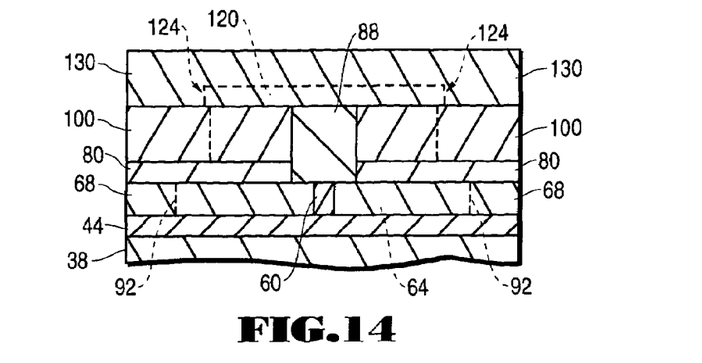
FIG. 14 is an end cross-sectional view taken along lines 14—14 of FIG. 15.
Figure 15:
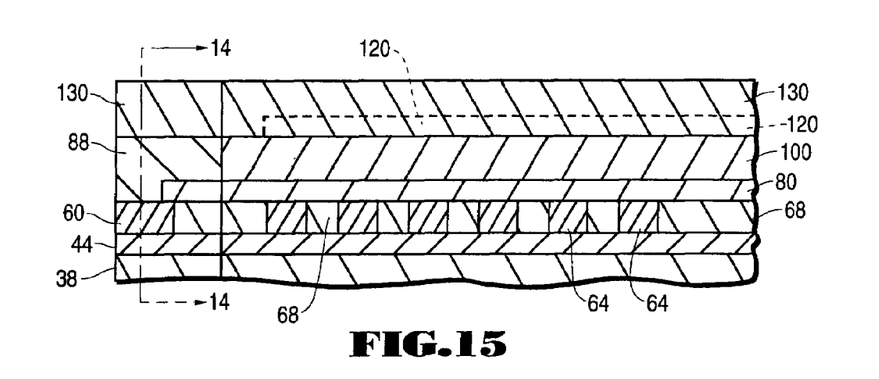
FIG. 15 is a side cross-sectional view taken along identical lines as FIG. 12.
Figure 16:
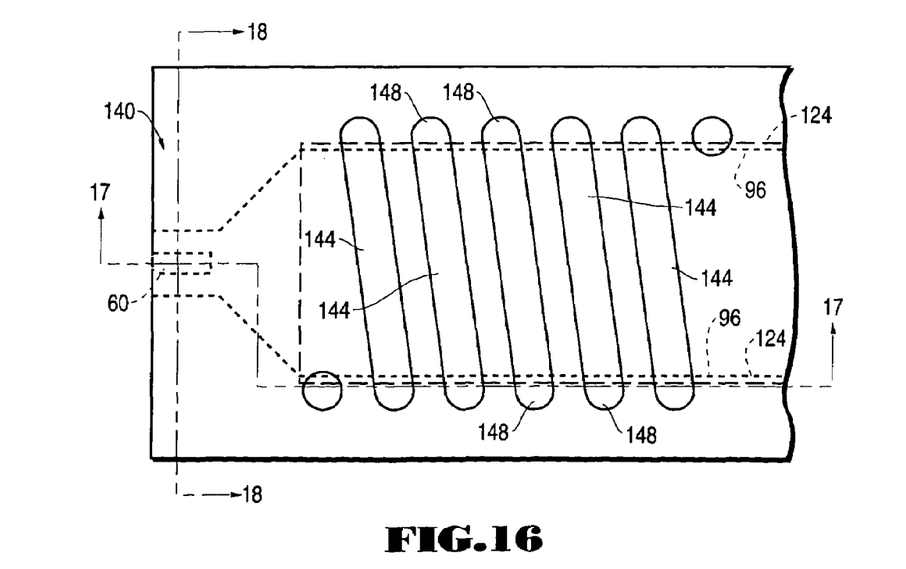
FIG. 16 is a top plan view.
Figure 17:
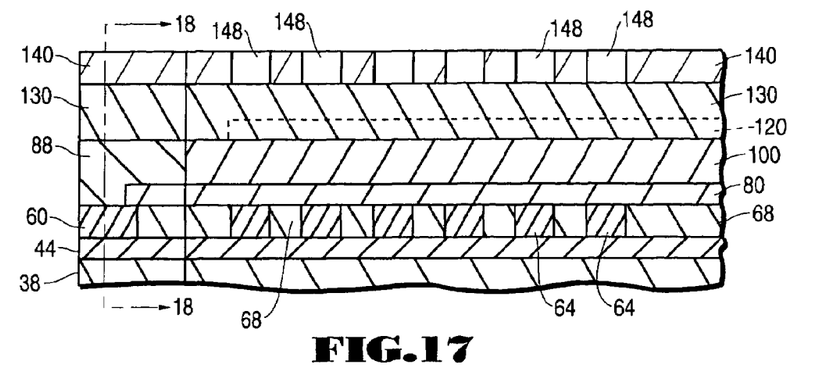
FIG. 17 is a side cross-sectional view taken along lines 17—17 of FIG. 16.
Figure 18:
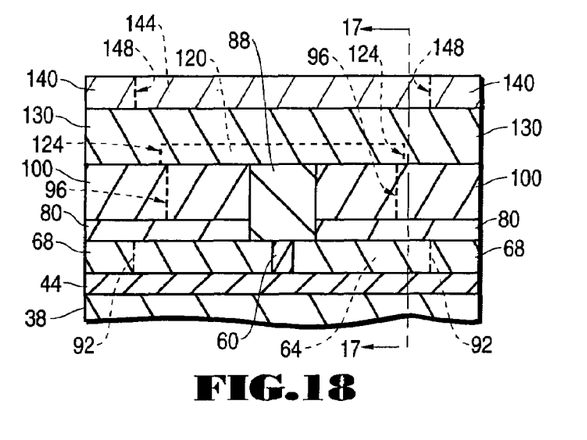
FIG. 18 is an end cross-sectional view taken along lines 18—18 of FIGS. 16 and 17.

As is depicted in FIGS. 14 and 15, following the deposition of the patterned etch stop layer 120, a further layer of insulator material 130 is deposited upon the device, covering the etch stop layer 120 and extending beyond the ends 92 of the lower helical coil traces which project outside of the etch step layer 120. Thereafter, as depicted in FIGS. 16, 17 and 18, a suitable patterned RIE mask 140 is fabricated upon the upper insulator material layer 130. The RIE mask is patterned to include opening 144 for upper helical coil traces in alignment with the lower helical coil traces previously fabricated, such that the outer ends 148 of the openings 144 for the upper helical coil traces are disposed above the projecting ends 92 of the previously fabricated lower helical coil traces 64.

Figure 19:
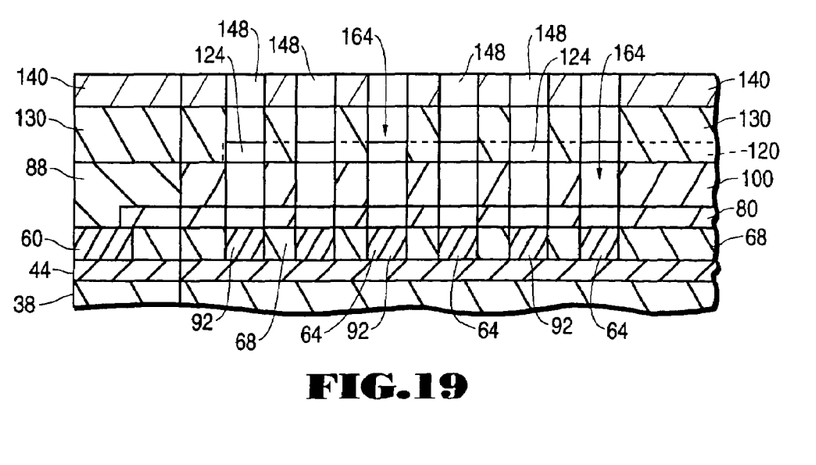
FIG. 19 is a side cross-sectional view taken along lines 19—19 of FIG. 20.
Figure 20:
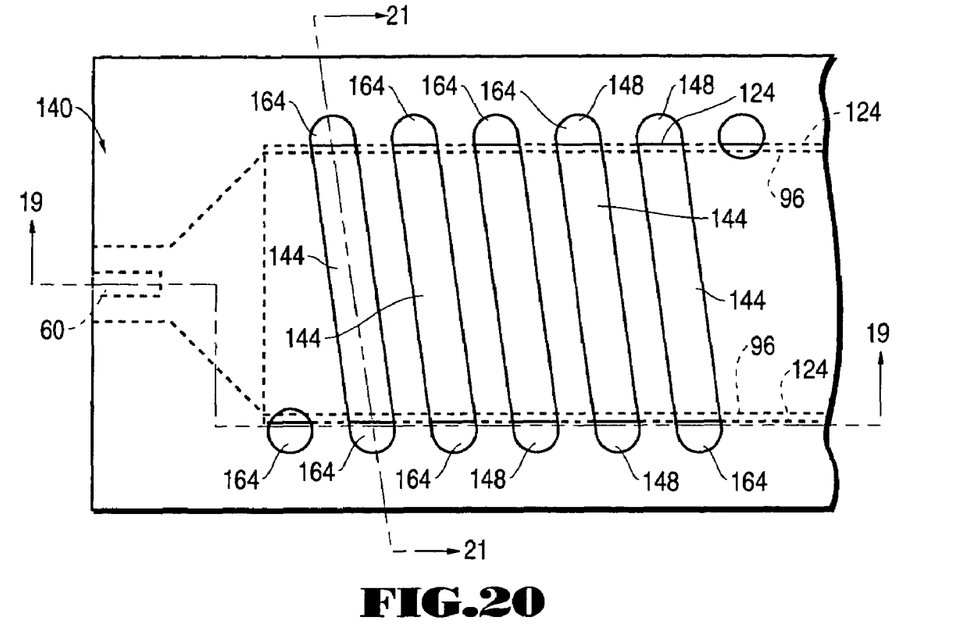
FIG. 20 is a top plan view.
Figure 21:
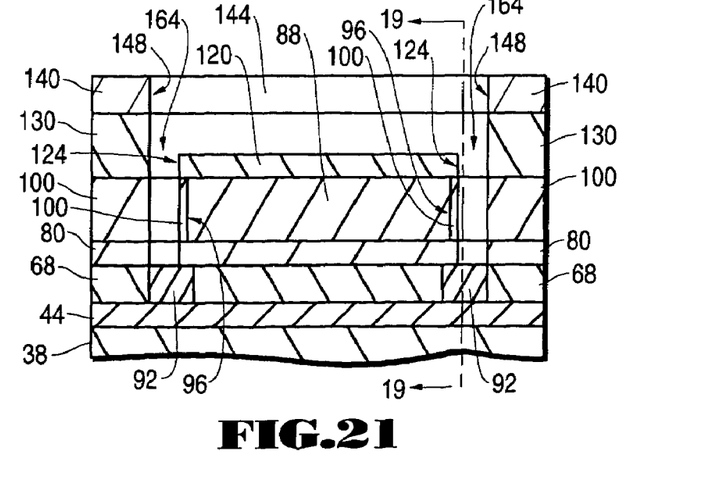
FIG. 21 is a cross-sectional view taken along skewed lines 21—21 of FIG. 20.

An RIE etch step is next performed through the RIE mask 140, as is depicted in FIGS. 19, 20 and 21. The RIE etching proceeds downward through the insulator layer 130 forming upper helical coil trenches 160 until it encounters the etch stop layer 120. However, as indicated hereabove, the outer ends 148 of the openings for the upper helical coil traces of the RIE mask extend laterally beyond the edges 124 of the etch stop layer 120. In these outer edge portions 148 of the mask's openings 144, the RIE etching continues downwardly through the insulation layers 130, 100 and 80, forming vertical interconnect vias 164, until the outer projecting ends 92 of the lower helical coil traces 64 are encountered. The etched RIE pattern thus includes both the upper helical coil trenches 160 and the downward coil interconnect vias 164.

Figure 22:
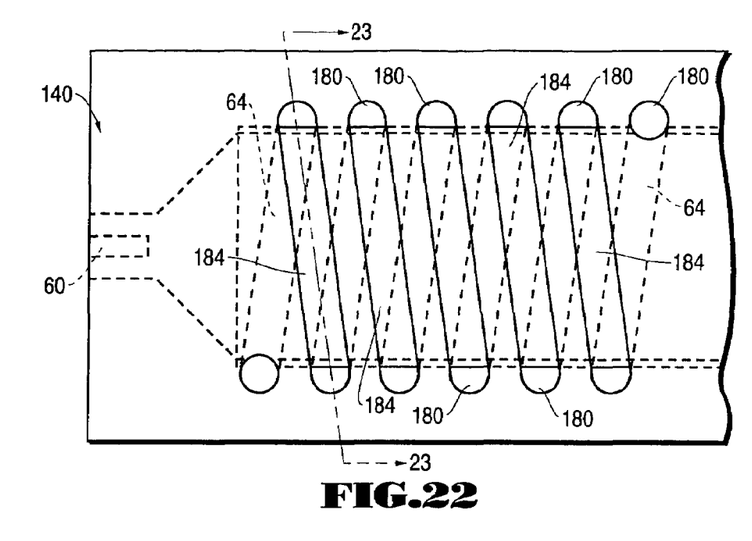
FIG. 22 is a top plan view.
Figure 23:
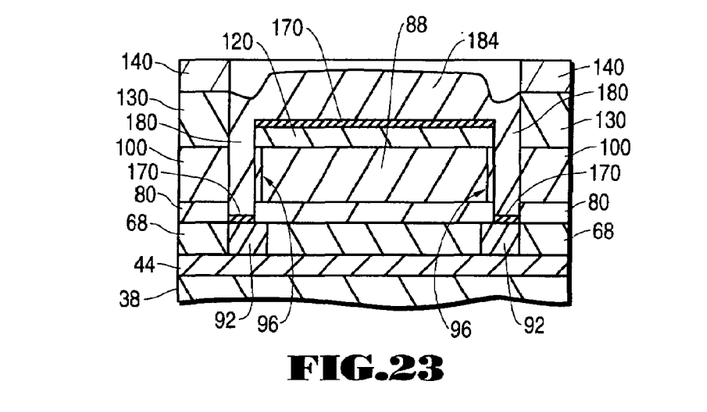
FIG. 23 is a cross-sectional view taken along skewed lines 23—23 of FIG. 22.

Thereafter, as is depicted in FIGS. 22 and 23, a seed layer 170, preferably composed of tantalum/copper, is deposited into the coil trenches 160 and vias 164, which is followed by the electroplating of copper helical coil elements into the trenches 160 and vias 164, plating up both the vertical interconnect lines 180 and the upper helical coil traces 184. It is therefore to be understood that at the completion of the copper plating step that the lower coil traces 64 are electrically interconnected with the upper coil traces 184 through the vertical copper interconnect lines 180, such that the helical coil is essentially fabricated. A CMP step is next performed to clean up the excess plated copper from the electroplating step, such that the upper helical coil traces are independently well defined. Subsequent process steps that are well known in the art, are then performed and the magnetic head 200 of the present invention is encapsulated and completed.

Figure 24:
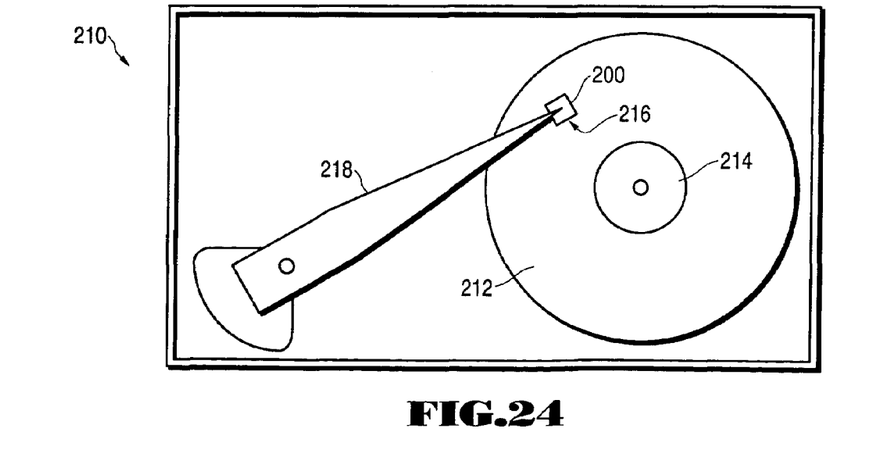
FIG. 24 is a simplified top plan view of a hard disk drive device including the magnetic head of the present invention.

The magnetic head 200 of the present invention is utilized to read and write data to magnetic media, such as hard disks in hard disk drive devices. A simplified top plan view of a hard disk drive 210 is presented in FIG. 24, wherein at least one hard disk 212 is rotatably mounted upon a motorized spindle 214. A slider 216, having a magnetic head 200 formed thereon, is mounted upon an actuator arm 218 to fly above the surface of each rotating hard disk 212, as is well known to those skilled in the art. The magnetic head 200 of the present invention enables the hard disk drive to write data to the hard disk at a faster data writing rate due to the helical coil configuration of the magnetic head 200. Because the magnetic head 200 is easier and less expensive to fabricate, the hard disk drive 210 with the magnetic head 200 is more economical to manufacture.

A significant feature of the magnetic head 200 of the present invention is the simultaneous fabrication of the upper helical coil traces 184 and the vertical coil interconnect liens 180, such that the upper helical coil traces 184 and the interconnects 180 are integrally formed in one process step. This single step fabrication process is enabled through the use of an RIE etch process that simultaneously creates the trenches 160 of the upper helical coil traces and the vertical vias 164 for the interconnects 180. The patterned etch stop layer 120 that is deposited on top of the yoke is a significant structural element in halting the RIE etching above the yoke, and the etch stop layer 120 thus serves as an electrical insulation layer between the subsequently deposited upper coil traces and the yoke. If this single step fabrication process is not utilized, then the vias must be created and plated up, followed by the alignment of a mask for the upper coil traces, and the separate trench formation and plating up of the upper coil traces. Therefore, because the upper coil traces and the vertical interconnects are fabricated in a single RIE etch step, the overall fabrication of the device is simplified over prior art helical coil fabrication processes in which the vertical interconnects are fabricated separately from the upper helical coil traces. The fabrication method of the present invention therefore facilitates the creation of a magnetic head 200 having a fine pitch helical coil in a fabrication process that is more easily and efficiently accomplished, and which therefore produces a higher product yield. Because the helical coil facilitates the use of a shorter yoke within the magnetic head 200, the magnetic flux rise time of the magnetic head is decreased and the data writing rate of the magnetic head is increased.

While the present invention has been shown and described with regard to certain preferred embodiments, it is to be understood that those skilled in the art will develop certain alterations and modifications thereto. It is therefore intended that the following claims cover all such alterations and modifications that nevertheless include the true spirit and scope of the invention.

What is claimed is:

1. A method for forming a magnetic head, comprising the steps of:
   forming a first magnetic pole upon an insulator layer;
   forming a write gap layer upon said first magnetic pole;
   forming a plurality of lower helical coil traces upon said write gap layer;
   forming a yoke portion of a second magnetic pole above said lower helical coil traces;
   forming an etch stop layer upon said yoke;
   forming an etchable layer upon said etch stop layer;
   forming trenches for upper helical coil traces within said etchable layer and forming vias for vertical interconnect lines, wherein said trenches and vias are fabricated utilizing a single reactive ion etch (RIE) process step;
   forming a plurality of upper helical coil traces above said yoke and within said trenches, and forming a plurality of vertical interconnect lines within said vias between said upper helical coil traces and said lower helical coil traces, wherein said upper helical coil traces and said vertical interconnect lines are fabricated in a single process step, such that they are integrally formed;
   whereby said lower helical coil traces, said vertical interconnect lines and said upper helical coil traces are electrically connected to form a helical coil that surrounds said yoke.

2. A method for fabricating a magnetic head as described in claim 1 including the further steps of forming an insulation layer upon said lower helical coil traces and beneath said yoke.

3. A method for fabricating a magnetic head, comprising:
   forming a first magnetic pole upon an insulator layer;
   forming a write gap layer on said first magnetic pole layer;
   forming a P2 pole tip in a pole tip layer on said write gap layer;
   forming a plurality of lower helical coil traces in said pole tip layer;
   forming a first insulator layer on said lower coil traces;
   forming a yoke on said first insulator layer, said yoke having lateral side edges, and being formed such that end portions of said lower helical coil traces extend outward beyond said lateral side edges of said yoke;
   forming a second insulator layer at said lateral side edges of said yoke and above said end portions of said lower helical coil traces;
   forming a third insulator layer on top of said yoke;
   forming a fourth insulator layer, said fourth insulator layer having a central portion that is formed upon said third insulator layer and side portions that are formed upon said second insulator layer;
   forming a plurality of upper helical coil traces within said fourth insulator layer and on top of said third insulator layer, such that lateral ends of said upper helical coil traces project outward above said lateral end portions of said lower helical coil traces;
   forming a plurality of vertical interconnect lines within said first, second and fourth insulator layers between said projecting ends of said upper helical coil traces and said end portions of said lower helical coil traces, wherein said upper helical coil traces and said vertical interconnect lines are integrally formed with a continuity of the same material composition throughout said vertical interconnect lines and said upper helical coil traces.

4. A method for fabricating a magnetic head as described in claim 3 including forming said yoke with a planar upper surface and forming said second insulator layer with a planar upper surface, and wherein said upper surface of said yoke and said upper surface of said second insulator layer are coplanar.

5. A method for fabricating a magnetic head as described in claim 4 including forming said third insulator layer with lateral side edges that don't extend above said end portions of said lower helical coil traces, and wherein said vertical interconnect lines are formed outside of said lateral side edges of said third insulator layer.

6. A method for fabricating a magnetic head as described in claim 5 wherein said coil traces are formed using electroplating fabrication techniques.

7. A method for fabricating a magnetic head as described in claim 6 wherein said coil traces are composed of copper.

8. A method for fabricating a magnetic head as described in claim 3 wherein trenches are formed in said fourth insulator layer, and wherein vias are formed for fabricating said vertical interconnect lines therewithin, and wherein said trenches and said vias are formed in a single reactive ion etch (RIE) process step.

9. A method for fabricating a magnetic head as described in claim 8 wherein said third insulator layer is composed of a material that differs from the material of said first, second and fourth insulator layers, such that said third insulator layer acts as an etch stop layer in a reactive ion etch (RIE) step, and said first, second and fourth insulator layers are etchable in said RIE step.

10. A method for fabricating a magnetic head as described in claim 8 wherein said upper helical coil traces and said vertical interconnect lines are plated into said trenches and said vias in a single electroplating process step.

* * * * *